(12) United States Patent
Spagnola

(10) Patent No.: US 10,668,546 B2
(45) Date of Patent: Jun. 2, 2020

(54) MITER CUTTING SLIDE FOR JIG SAW

(71) Applicant: Nicholas J Spagnola, York, PA (US)

(72) Inventor: Nicholas J Spagnola, York, PA (US)

( * ) Notice: Subject to any disclaimer, the term of this patent is extended or adjusted under 35 U.S.C. 154(b) by 170 days.

(21) Appl. No.: 16/035,645

(22) Filed: Jul. 15, 2018

(65) Prior Publication Data

US 2019/0388985 A1    Dec. 26, 2019

Related U.S. Application Data

(60) Provisional application No. 62/688,336, filed on Jun. 21, 2018.

(51) Int. Cl.
| | | |
|---|---|---|
| *B23D 49/08* | (2006.01) | |
| *B23D 59/00* | (2006.01) | |
| *B23Q 3/10* | (2006.01) | |
| *B23D 49/00* | (2006.01) | |

(52) U.S. Cl.
CPC .......... *B23D 59/007* (2013.01); *B23D 49/007* (2013.01); *B23Q 3/105* (2013.01)

(58) Field of Classification Search
CPC .. B23D 59/007; B23D 49/007; B23D 51/005; B23D 51/025; B23D 57/0076; B23D 51/02
See application file for complete search history.

(56) References Cited

U.S. PATENT DOCUMENTS

| 2,725,905 | A | | 12/1955 | Pulera | |
|---|---|---|---|---|---|
| 2,780,249 | A | | 2/1957 | Andreae | |
| 4,186,784 | A | * | 2/1980 | Stone | B23D 49/08 |
| | | | | | 108/28 |
| 4,320,678 | A | * | 3/1982 | Volk | B23D 49/162 |
| | | | | | 269/87.2 |
| 5,890,524 | A | | 4/1999 | Tucker | |
| 8,544,372 | B2 | | 10/2013 | Economaki | |
| 2005/0204888 | A1 | * | 9/2005 | Fries | B23Q 9/005 |
| | | | | | 83/745 |
| 2008/0110528 | A1 | * | 5/2008 | Kent | B23D 51/02 |
| | | | | | 144/286.5 |
| 2013/0081526 | A1 | | 4/2013 | Rybka | |
| 2015/0083103 | A1 | * | 3/2015 | Calas | B28D 1/043 |
| | | | | | 125/14 |
| 2015/0183126 | A1 | | 7/2015 | Korschgen | |

FOREIGN PATENT DOCUMENTS

DE    102007044112 A1 *    4/2008   ............ B23D 51/02

* cited by examiner

*Primary Examiner* — Daniel J Colilla

(57) ABSTRACT

A portable cutting table, with SLIDE, and a TABLE, an adjustable BACKPLATE to support material being cut, and a BASE, all which support a JIG SAW, mounted upside down on the SLIDE, to allow easy control of cutting to Molding, Millwork, Stair Edging, angled cuts, with easy control of motor/blade speed, and easy visibility of cutting markings on the material being worked upon.

7 Claims, 17 Drawing Sheets

MITER CUTTING SLIDE FOR JIG SAW

Figure 1:
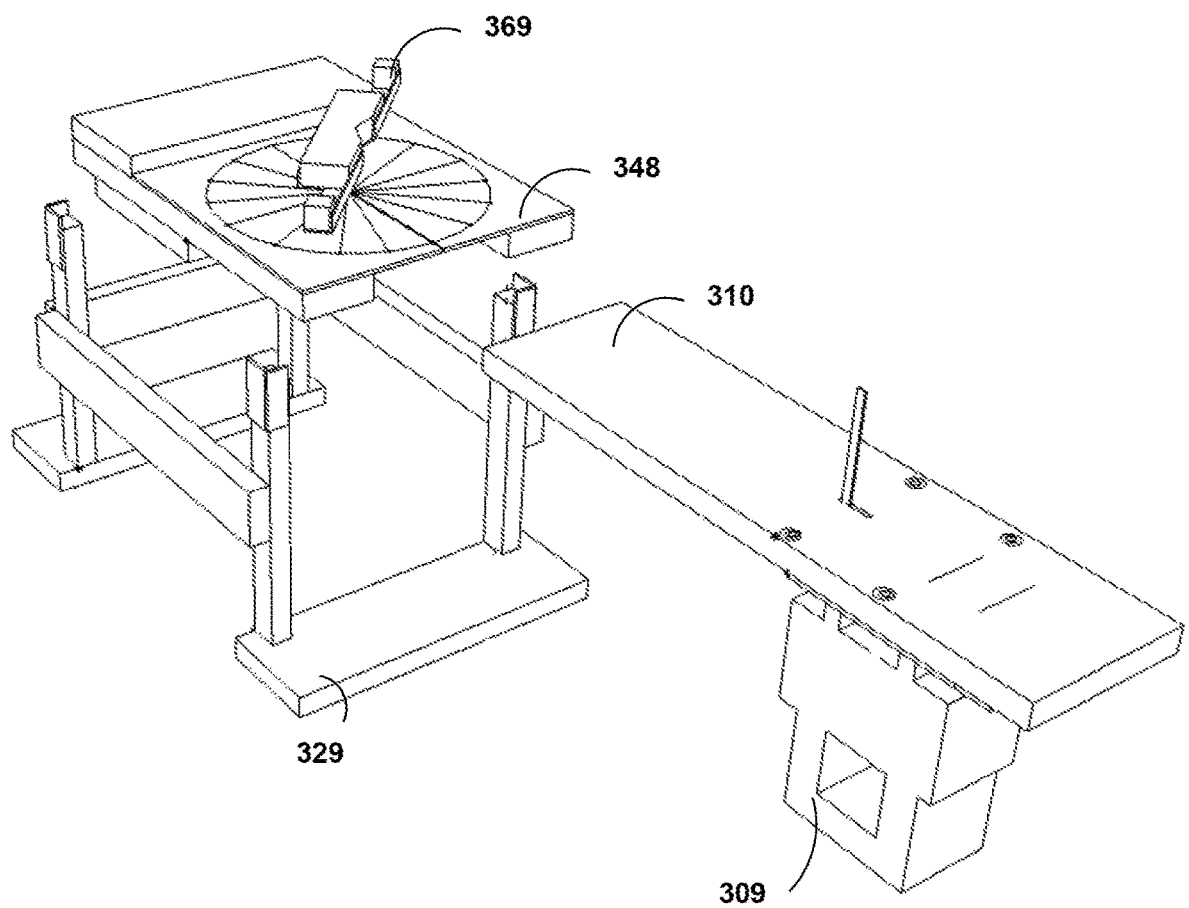

CROSS-REFERENCE, AND COMPARISON, TO RELATED APPLICATIONS, PATENTS, AND INTERNET WEB LINKS

A Search was done using "SLED FOR JIG SAW" and various permutations of this. Descriptions of these patents are included, comparing them to the MITER CUTTING SLIDE FOR JIG SAW. These are also noted on form INFORMATION DISCLOSURE STATEMENT BY APPLICANT. As per the INFORMATION DISCLOSURE STATEMENT BY APPLICANT, I was not aware of these designs until after I designed my MITER CUTTING SLIDE FOR JIG SAW. I listed these because they have some type of table, or saw, or slight portability, but in the descriptions below, I note why I do not believe my design infringes on these designs. I believe my design solves some unique cutting issues that none of these designs addresses.

US20130081526A1—Pivoting saw system—This device does not allow for easy rotating angle adjustment, and does not allow for easy manipulation of longer material.

US20150183126A1—Box Joint Jig for Machine Tables—This device only cuts specific joints for joining, not for use with molding materials U.S. Pat. No. 2,725,905A—Jig saws formed from circular-saw table saws—This device does not allow for easy use with long molding materials, and does not have the easy angle adjustment of the MITER CUTTING SLIDE FOR JIG SAW. This patent is more of a scroll saw than a jig saw, and the throat of a scroll saw precludes easy material movement and adjustment U.S. Pat. No. 2,780,249A—Table jigsaw with tiltable blade—This saw is also more of a scroll saw. It has a throat which limits movement of materials to be cut, and there is no BACKPLATE or FENCE to support materials being cut.

U.S. Pat. No. 5,890,524A—Router table sled—This is a slightly similar idea, of a cutter mounted beneath a table, but this is for routers, and has a fence system which only allows 0 or 90 degree cutting/routing, and the router is not designed with cutting in mind, it is more for shaping of edges on various materials.

U.S. Pat. No. 8,544,372B2—Manual table saw and blade therefor—This device does have a movable sled, which holds the material, on a stationary table which holds the blade. This device, however, is not easily adapted to a JIG SAW, and does not allow easy access to the variable speed trigger of the JIG SAW. This device is also requiring specialized blades, whereas the MITER CUTTING SLIDE FOR JIG SAW is not requiring specific blades or cutting guides, it is making an easy slide mechanism for currently easily available JIG SAWS.

Internet Web and YouTube links—these were discovered by me on 2018 Jul. 10 while doing a search on JIG SAW TABLE, which I had NOT done before. There are some items which have similar features to my invention, but I have noted why I believe my design is unique compared to these. I have captured some screen shots from the video's, or the web sites, but the YouTube video's provide more detail.

BladeRunner X2 Portable Tabletop Saw—WX572L—WORX

This is a commercial product by WORX company. I do not know if they have a patent on this. This is a standalone motor/saw/table combination. That requires the user to invest in a new motorized cutting device, whereas my invention allows them to use their current compatible JIG SAW.

Also, importantly, the sliding cutting guide for cutting material at an angle, is OFF CENTER from the blade. This leads to less accuracy than having the cutting guide support the material at the CENTER point where the blade contacts the material. Material can flex, twist, have an inaccurate cut, if supported OFF CENTER. My invention has the support at the CENTER of cutting.

Two links by same individual, same item—by SERGIO

How to make the jigsaw table crosscut sled (DATE 2016 Feb. 11)

Some talking about my homemade jigsaw table (DATE 2016 Feb. 18)

The two links by SERGIO do have more similarities to my invention. His device has a solid table, on which he has mounted the JIG SAW. However, the table mount is not very portable. He does have a sliding platform that rides in grooves on the JIG SAW TABLE. However, his sliding platform only has a fixed crosspiece for supporting material when cut, such that only 90 degree cuts could be done.

His design does not allow for easy sliding movement of the JIG SAW against the material, whereas my invention allows for Sliding the JIG SAW against the material to be cut, OR making the TABLE movable, AND has a portable design with a base, for easy movement and positioning at a worksite.

a Jig Saw platform mounting system by company named Neutechnik

This is a tool manufactured in Germany. It is a kit that allows fastening of a JIG SAW to a TABLE. The TABLE is required to be clamped to a bench or other solid surface. It only allows the material to be pushed against the blade, it does not allow the JIG SAW to be moved relative to the table or the material. Also, with its clamping to a workshop bench, it loses portability, and ALSO loses ability to work with longer material, and loses ability for versatility at a worksite. It does have an angled guide for cutting material at an angle, but just as above, this guide has the material being cut OFF CENTER from where the cut is desired, causing potential loss of accuracy for the cut.

Jigsaw Table Mount (DATE 2015 Feb. 19)

This is just a board, with a JIG SAW mounted to it, and the JIG SAW and TABLE combination get clamped to a workbench. There is no cutting guide, the material is being cut manually.

How To Make Jigsaw Table Machine‖DIY Jigsaw Table (DATE 2017 Aug. 28)

This is just a box platform, with JIG SAW mounted beneath it. The jig Saw is permanently fastened. There is no slide table to more easily adjust material to be cut, and there is no cutting guide mechanism.

Making a Jigsaw table (DATE 2016 May 21)

This is a box that contains a JIG SAW mounted inside, with blade protruding. It does not have a slidable TABLE for material control and cutting. It is more portable than the benchtop clamped types. It does NOT have easy removability of the JIG SAW, thus preventing using the JIG SAW from being removed to use in other applications.

wolfcraft jigsaw table (part no. 6197000) (DATE 2017 Oct. 17)

This is a commercial product. It is just a base, to which you fasten the JIG SAW. It is required to fasten it to a solid work surface, there is no portable base for worksite location. The JIG SAW is more easily removable, but there is no movable TABLE for control of material to be cut. There is a GUIDE BAR to allow for STRAIGHT LONG cuts, but there is no ANGLE GUIDE to allow for controlled mitered cuts.

Homemade Jigsaw Table Machine II DIV Jigsaw Table (DATE 2018 Mar. 29)

This is just a box platform, with JIG SAW mounted beneath it. The jig Saw is permanently fastened. There is no slide table to more easily adjust material to be cut, and there is no cutting guide mechanism.

BACKGROUND

This invention addresses the ability to use convenient tools to cut decorative molding for inside room borders; stair tread metal molding to create angled or straight cuts; Baseboard decorative molding that covers floor transitions between walls and floor material (providing a decorative border instead of an edge that reveals the cut borders of wall and floor, or wall and ceiling), and, but not limited to, other repetitive or complex cutting operations for various materials.

Currently, the most common way to cut such material is to use a MITER SAW which is a special saw that usually has a 10 inch blade, has a platform on which you place the material to be cut, horizontally, against a rail, and then the 10 inch blade can be powered on, and pushed down onto the material, cutting it either at a 90 degree edge, or at other desired degrees of cut. This tool weighs about 50 pounds, is hard to move around, and with its powerful motor and blade, creates extensive dust, and it is difficult to prevent this dust from dissipating throughout the room (the unit has a lot of power because it is designed to cut across construction beams that are 2 inches by 4 inches, all the way up to 2 inches by 12 inches. Some units are designed with the motor/blade combination attached to sliding tracks, to allow even greater reach, to cut even larger pieces.

The MITER SAW is one of the most common methods used to do such cuts. However, this unit has disadvantages, because it is difficult to move, and sometimes is sold on a wheel based rack system, to allow for movement, but it is still difficult to move to the exact location of where you are working, due to its bulky nature, its dust creation, etc. This is not as problematic in a new construction site, where there is not finished furniture, clean rugs, livable space, but in an existing habituated home, where remodeling is being done, to add custom décor to a living area, this tool can wreak havoc with its dusty byproducts, and with its bulky size. Another disadvantage of a Miter saw is that for smaller items, the commonly issued cutting blade has cutting teeth that are too far apart, and they damage the wood edge, so a special expensive blade has to be purchased, and added to the machine, to cut down on edge damage. But this blade is slower cutting in larger material, so a contractor has to constantly switch blades to accomplish various tasks, and that requires a special wrench, and loss of time.

Another tool for such tasks is a TABLE SAW. This has the blade protruding up out of the table, the motor is below the table, and the material can be pushed into the blade, allowing for easier visibility. However, its disadvantages are the same as the miter saw, due to blade size, and amount dust created, due to lots of air from the motor running and the blade turning.

Another tool is a RADIAL ARM SAW. It has a movable motor/blade, on a swinging arm; (and some MITER SAWS with their rails are like a smaller version of a RADIAL ARM SAW). It makes objects easier to cut, since the object is against a rear fence/rail, like the MITER SAW, and the blade can be moved with one hand. But this has the SAME DISADVANTAGES as the miter saw, such as size, dust, lack of portability.

A better tool for cutting detailed corners or crosscuts for decorative molding is a JIG SAW. This is a hand-held motorized saw, with a blade that protrudes from the bottom, and the blade goes up and down, as you push across the top of the material to be cut. The motor and saw action is not as powerful as the above mentioned saws, and this is an advantage. Its smaller size, and smaller, stick-type blades, do not blow dust over an expansive area. This dust can be confined. Being smaller, and hand-held, the JIG SAW is able to be taken closer (or exactly) to where the material being cut is to be installed, thus saving time by not having to go to a central staging/cutting area, where the prior mentioned saws would be set up. Most JIG SAWS have a variable-speed trigger, thus allowing a more controlled cutting of the material being worked upon. It is easier to work on the long pieces of molding, for ceiling, flooring, etc. The pieces to be worked upon are many times very long, but only the ENDS of those pieces need cut, where they will be mated or joined to adjacent pieces, or a corner area, etc. So having the advantage of a more portable saw is beneficial.

However, a DISADVANTAGE of the Jig Saw by itself is that the person works from the top of the machine, holding the handle, and the material being worked with is below the saw platform, thus partially obscuring the measurement marks for cuts, and there is not a perpendicular (or other angled) rail against which the object to be cut can be positioned, the person has to set up a work spot to stabilize the pieces to be cut.

BRIEF SUMMARY OF THE INVENTION

An improved method for cutting molding, stair tread protectors, decorative wood edging, and other similar materials, whether they are short or long in length when being worked with, yet just need ends cut, or center areas customized, that creates benefit from a better saw system that allows control of blade speed, easy positioning of material to be cut, and easy portability to the area where the cutting needs to be done, without creating the extensive dust that other cutting methods create.

The MITER CUTTING SLIDE FOR JIG SAW solves these jig saw problems, and it uses a small portable platform, whereby either the JIG SAW and SLIDE can move while the working TABLE is stationary, OR the TABLE can be moved while the JIG SAW and SLIDE can remain stationary. The complete device is compact and movable to the actual workplace location where the cuts are to be made, thus making it much less cumbersome to have to continually manipulate long pieces of molding, trim, etc., flipping it end for end to cut each end, or to do customized cuts in the middle of a complex metal (or other material) decorative edge. (Metal is mentioned because it is ESPECIALLY difficult to work with, and it is difficult to repair cuts made in error)

BRIEF DESCRIPTION OF DRAWINGS, FIGURES, AND COMPONENT NUMBERS

BLACK AND WHITE DRAWING FIGURES are included as follows, with descriptions in sections below. Figures are grouped in sections for descriptive value.

FIG. 1 Operation of Slide—Slide with saw, removed from table, disassembled

Figure 2:
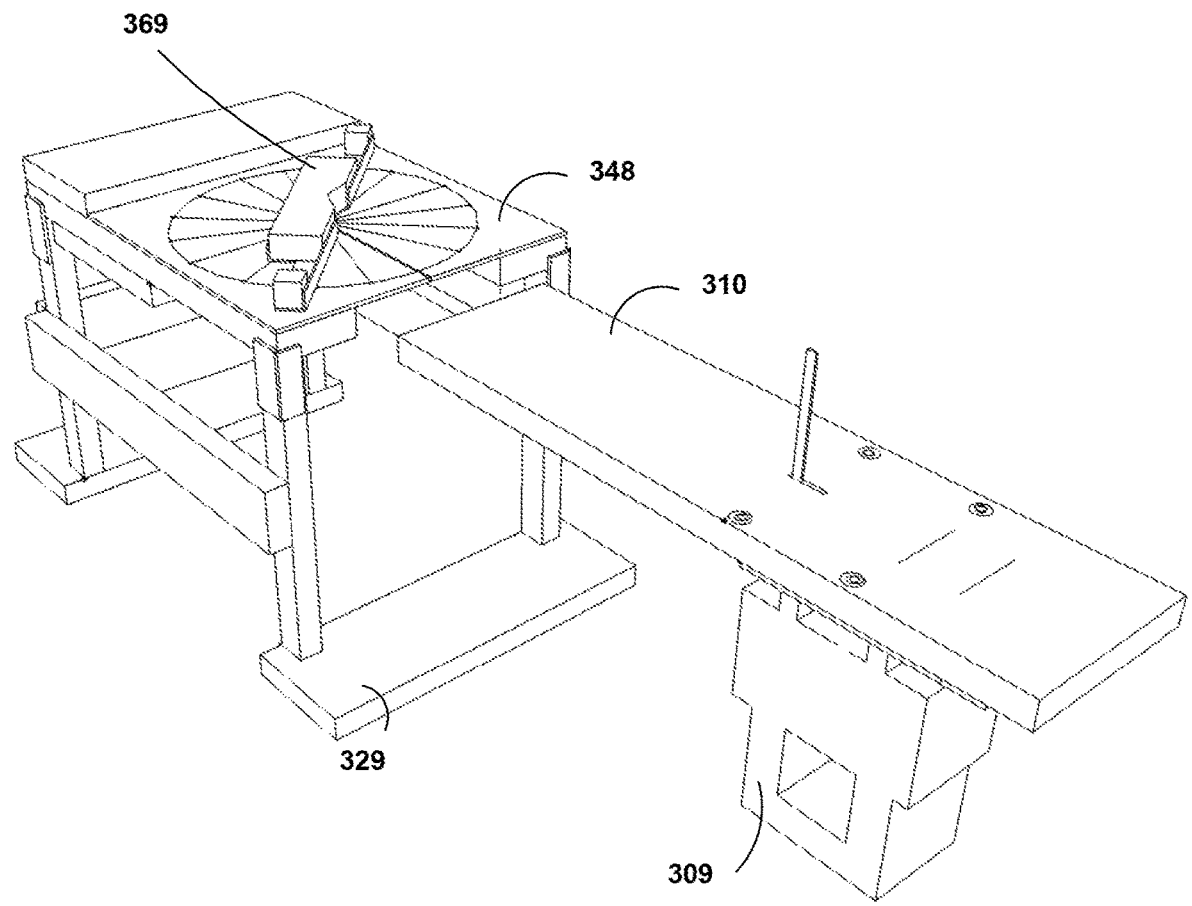

FIG. 2 Operation of Slide—Slide with saw, removed from table—table is assembled

Figure 3:
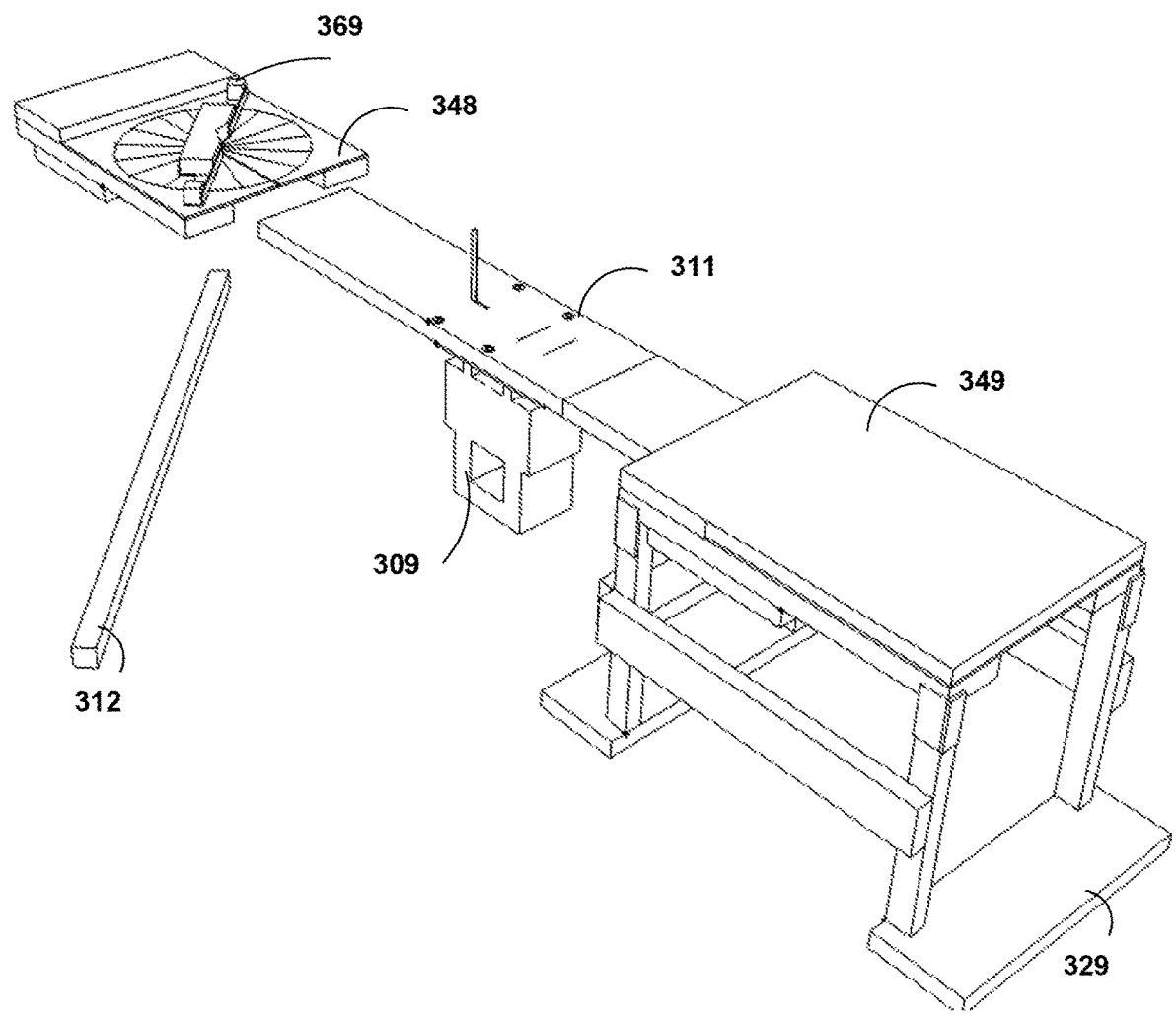
Figure 4:
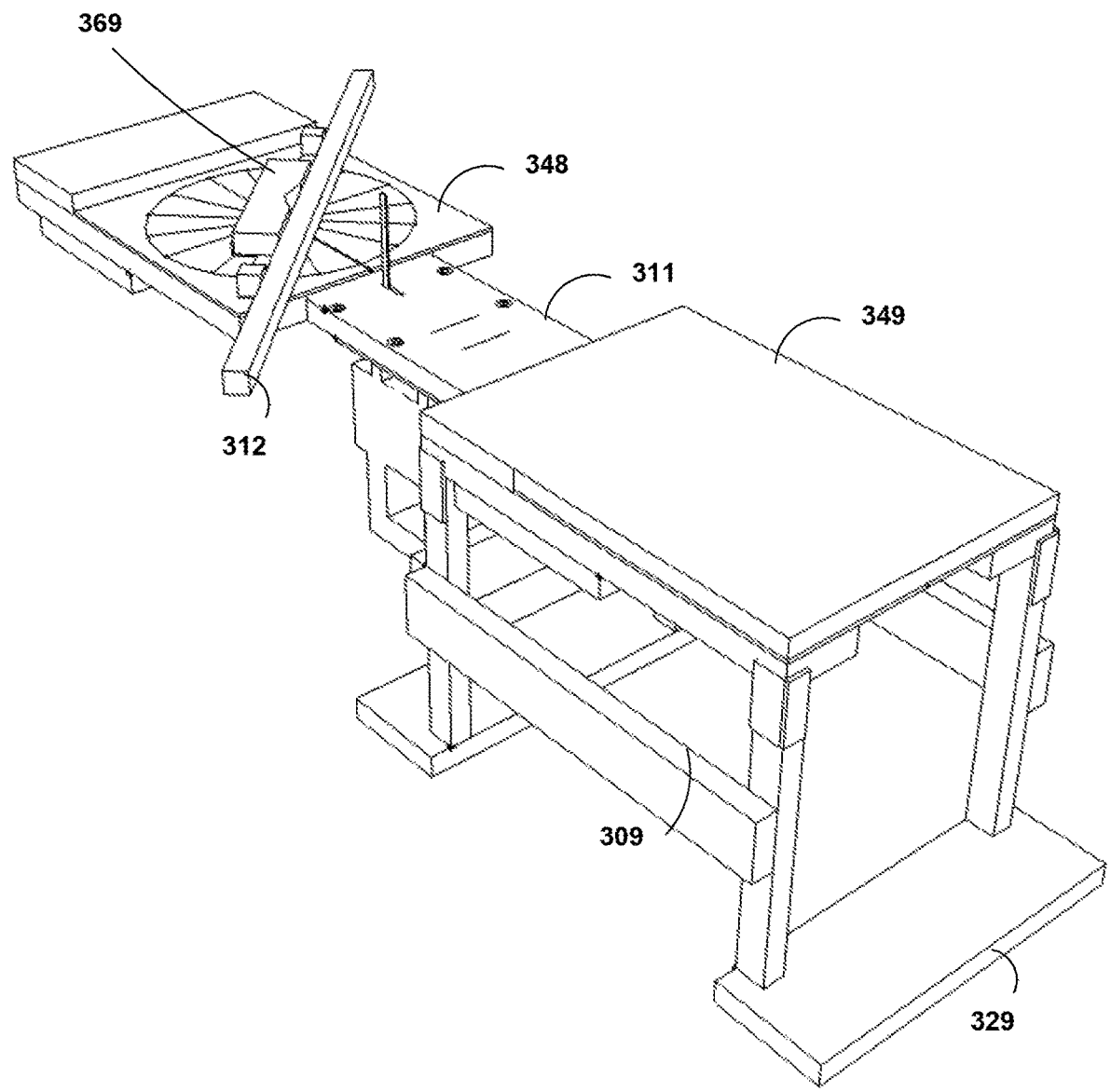
Figure 5:
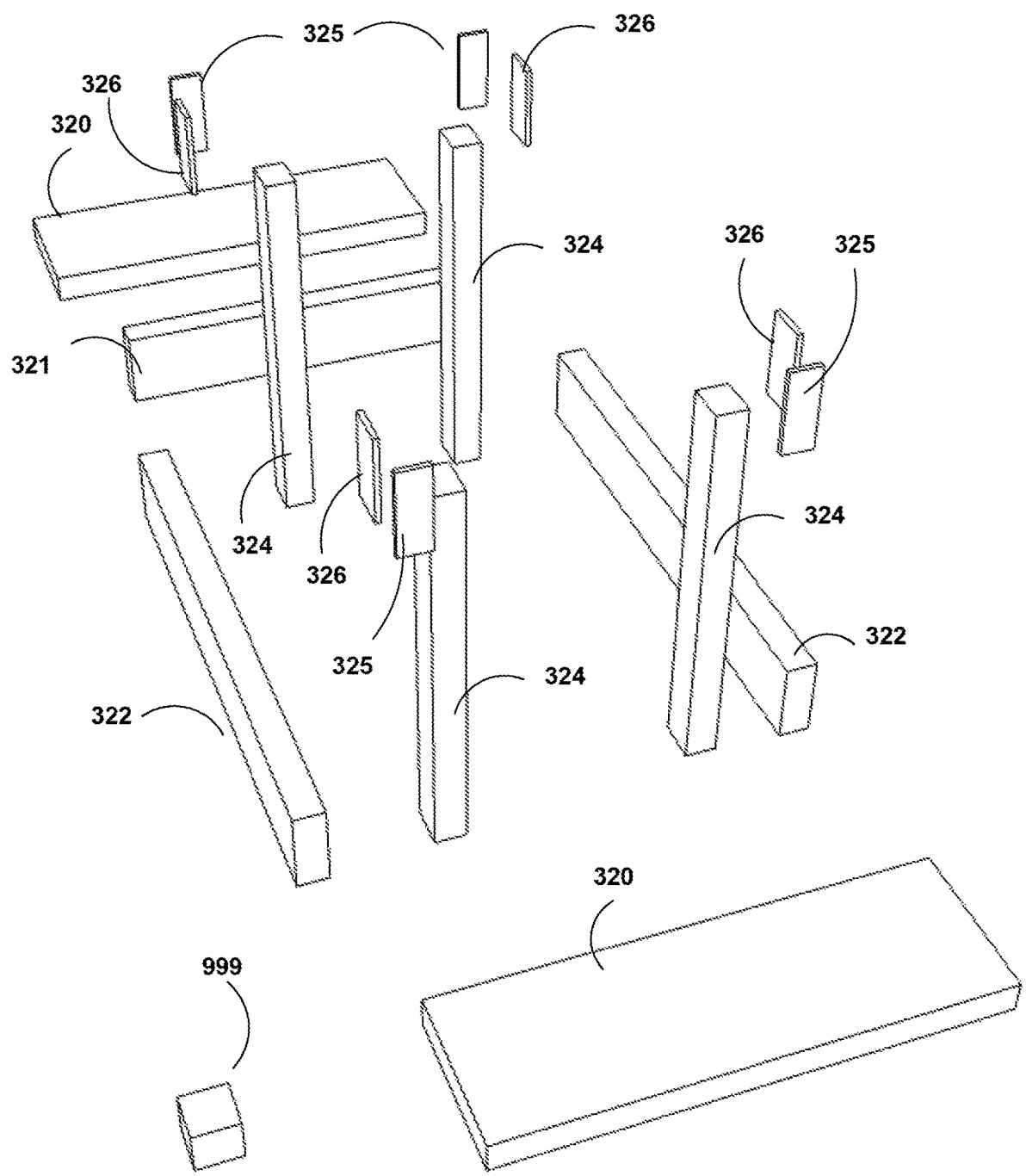
Figure 6:
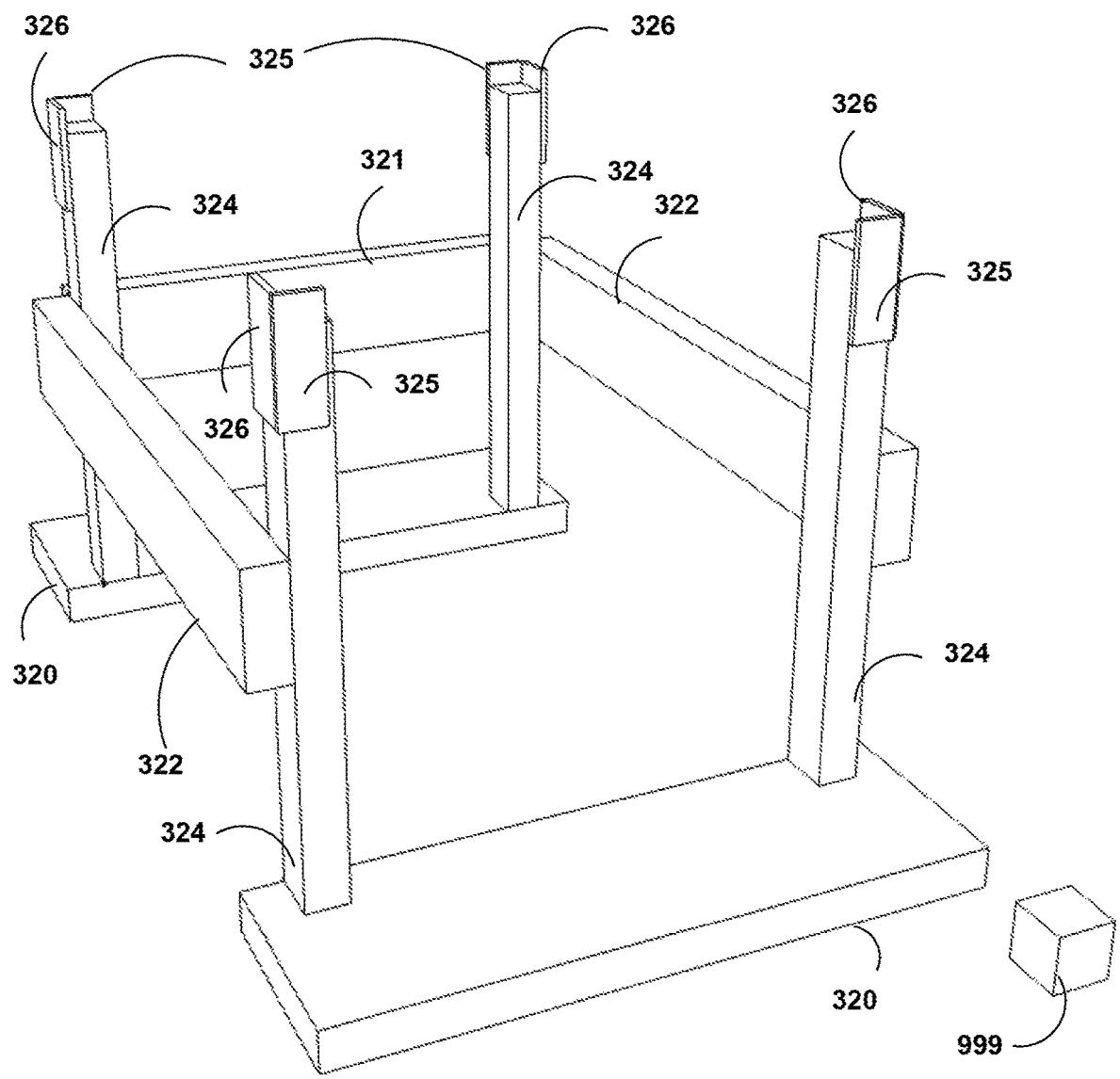
Figure 7:
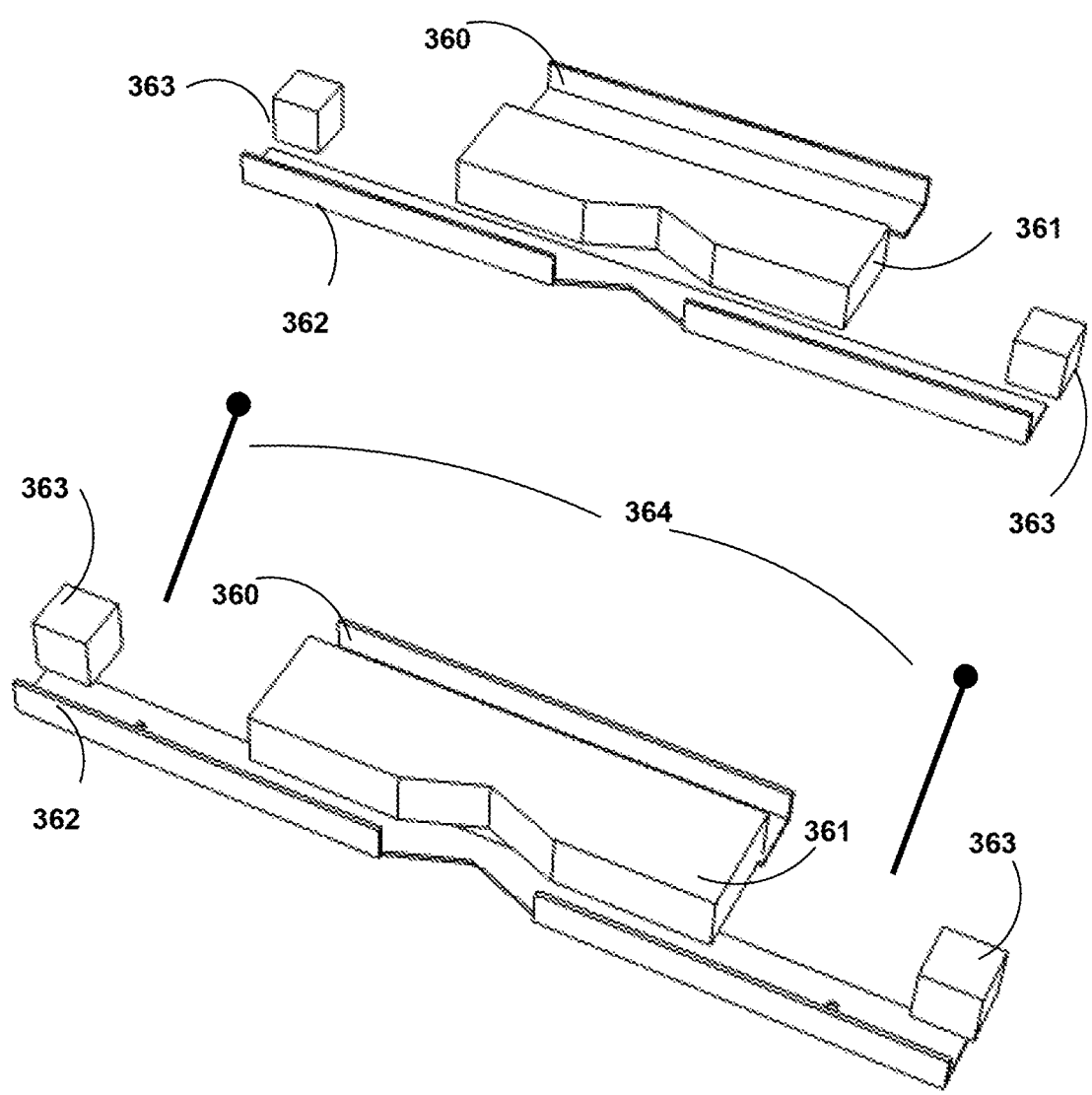
Figure 8:
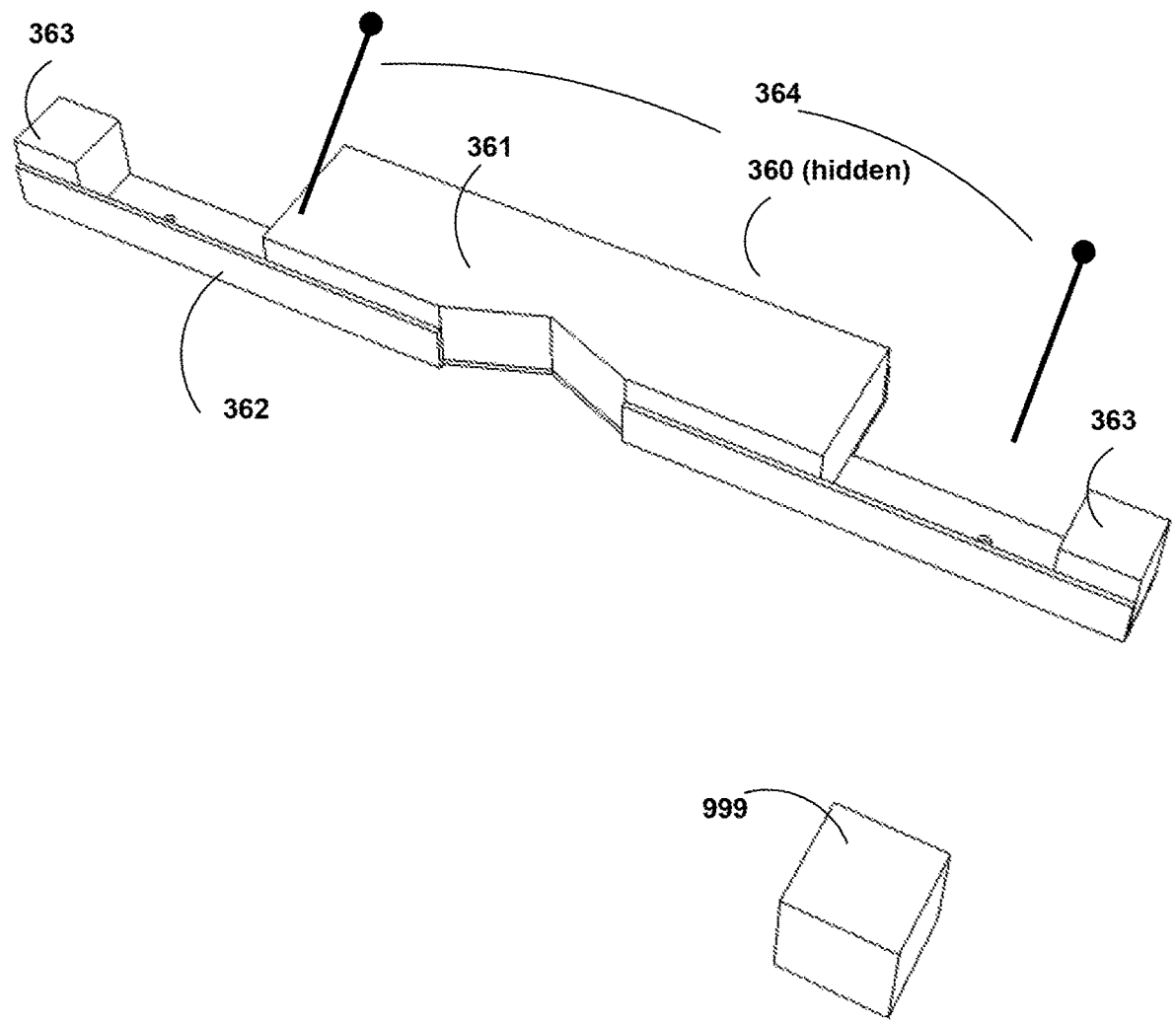
Figure 9:
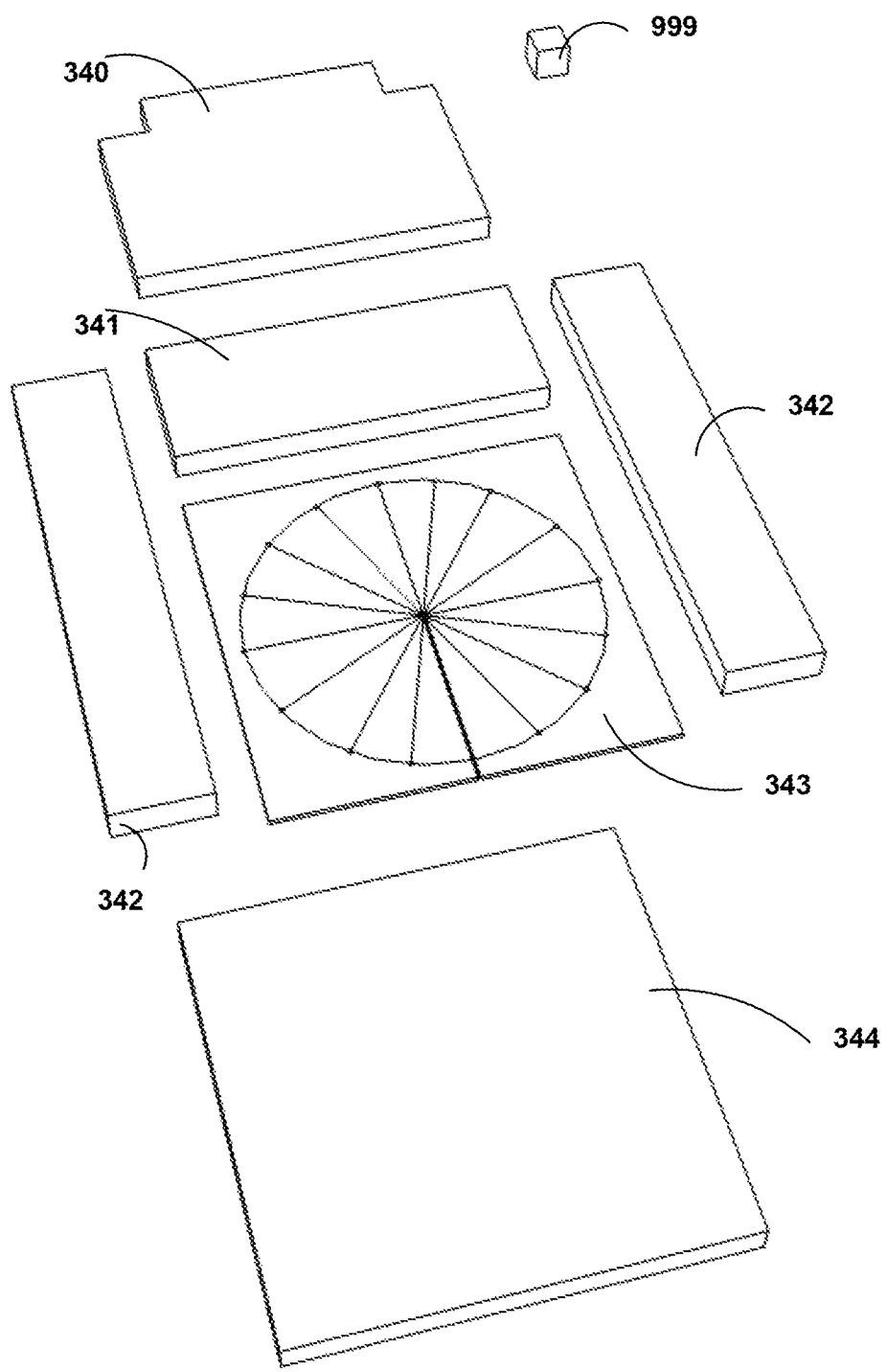
Figure 10:
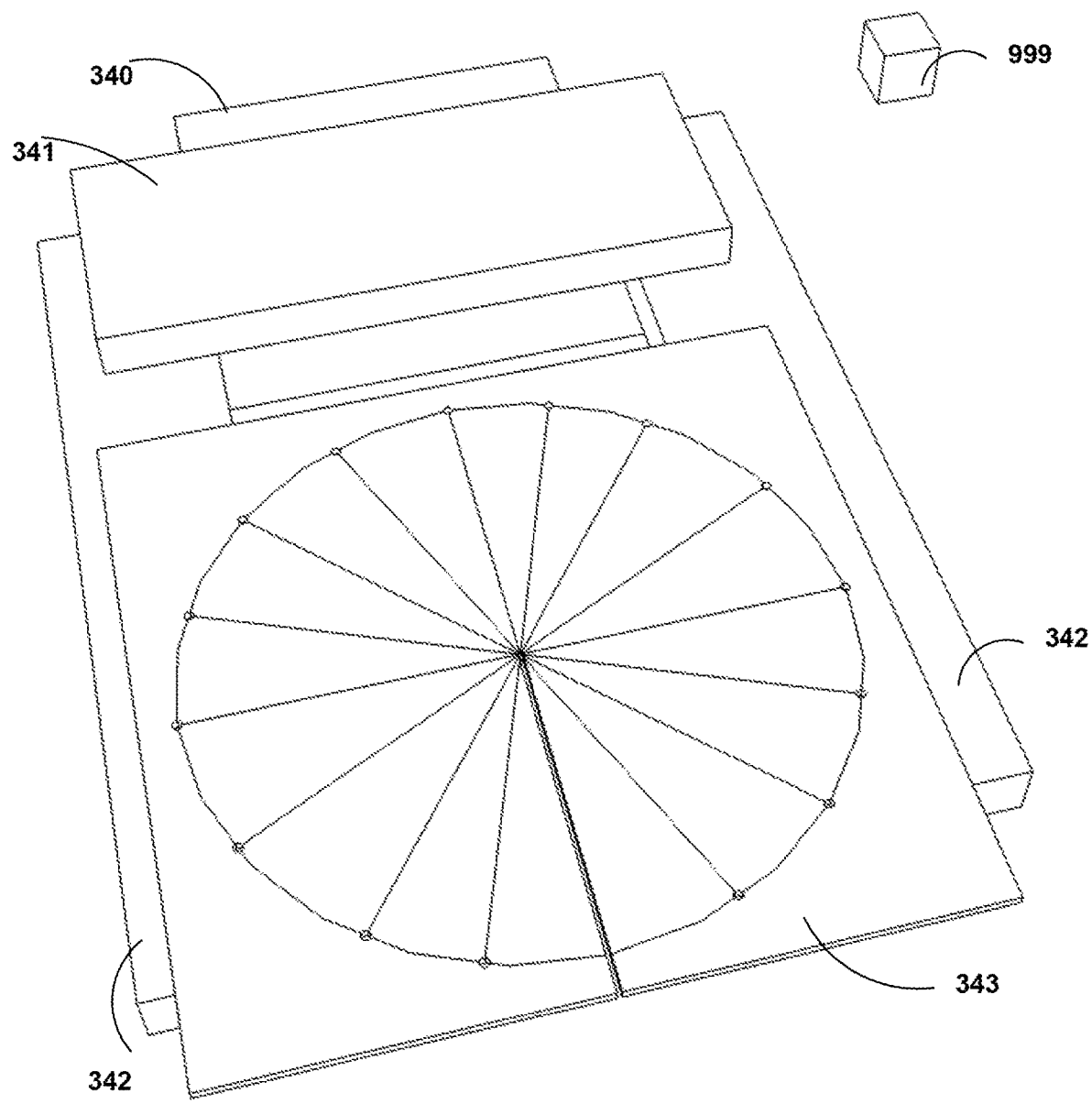
Figure 11:
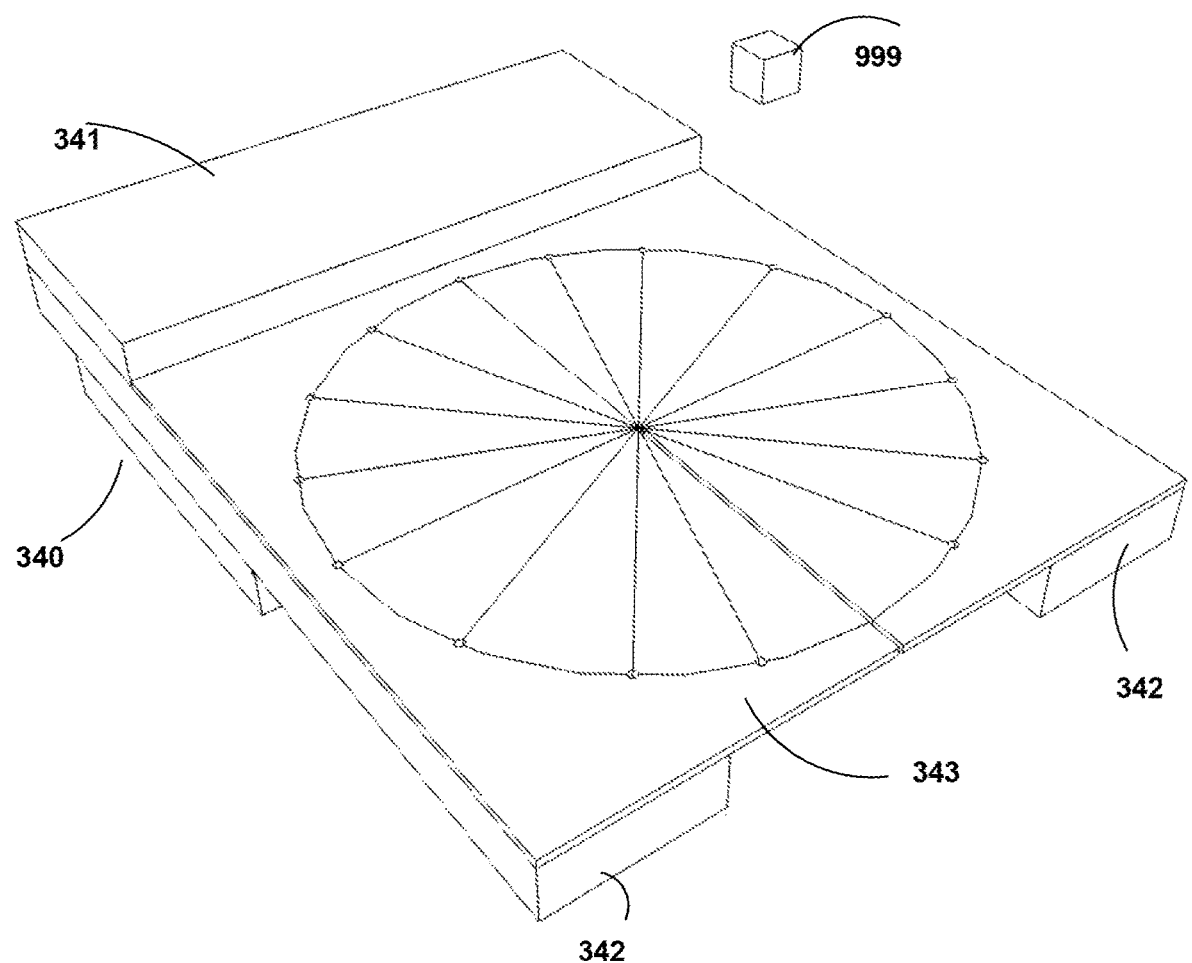
Figure 12:
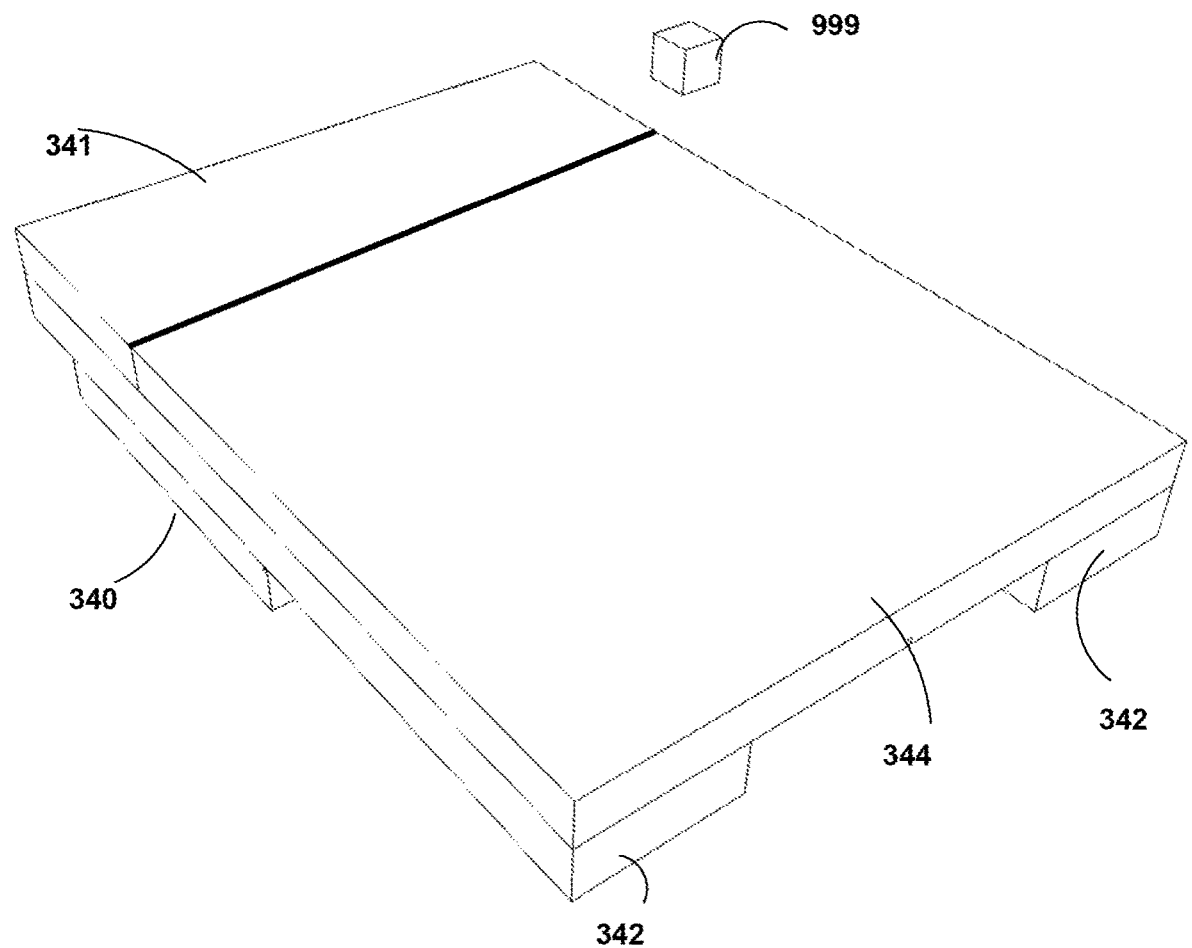
Figure 13:
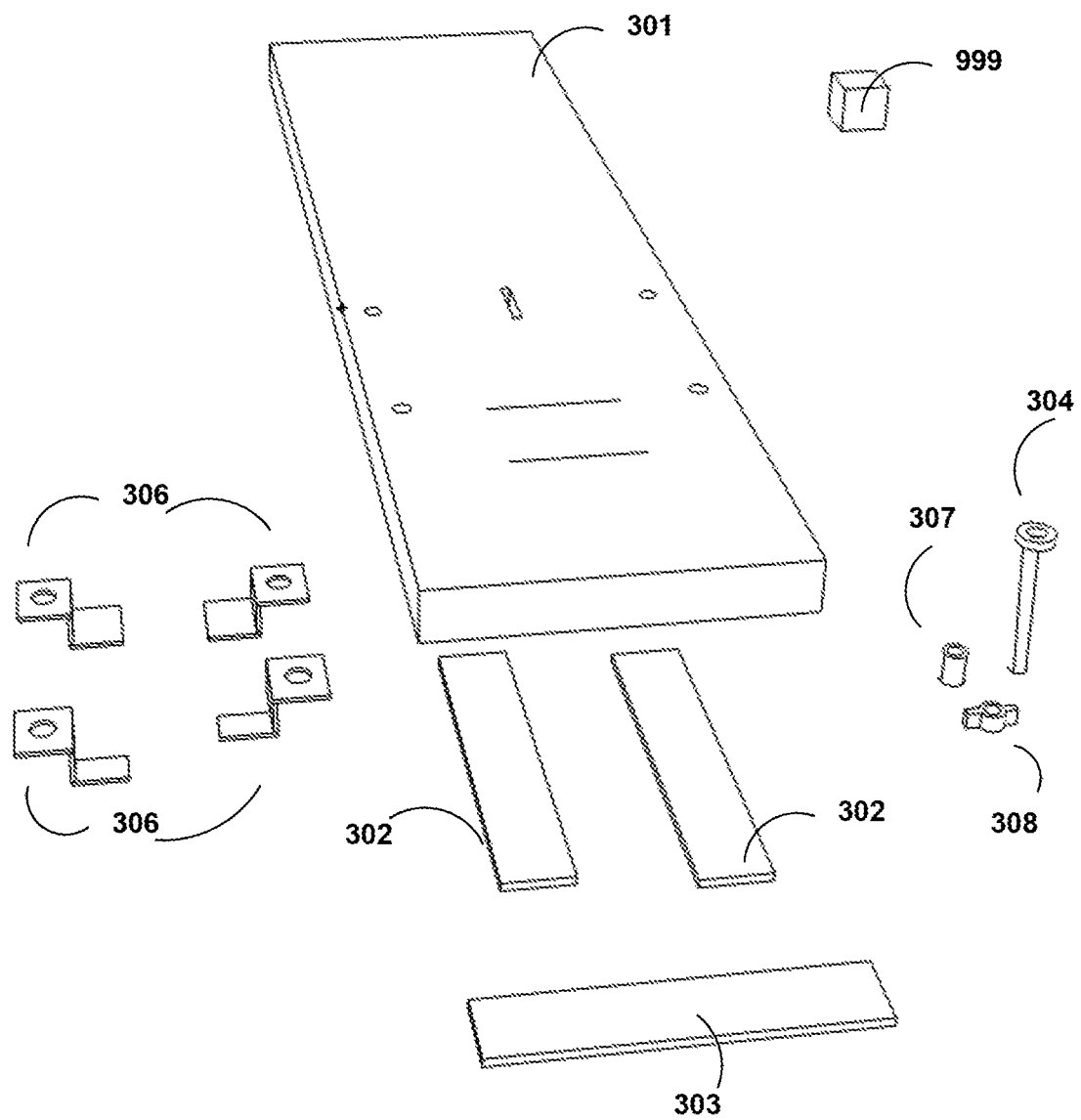
Figure 14:
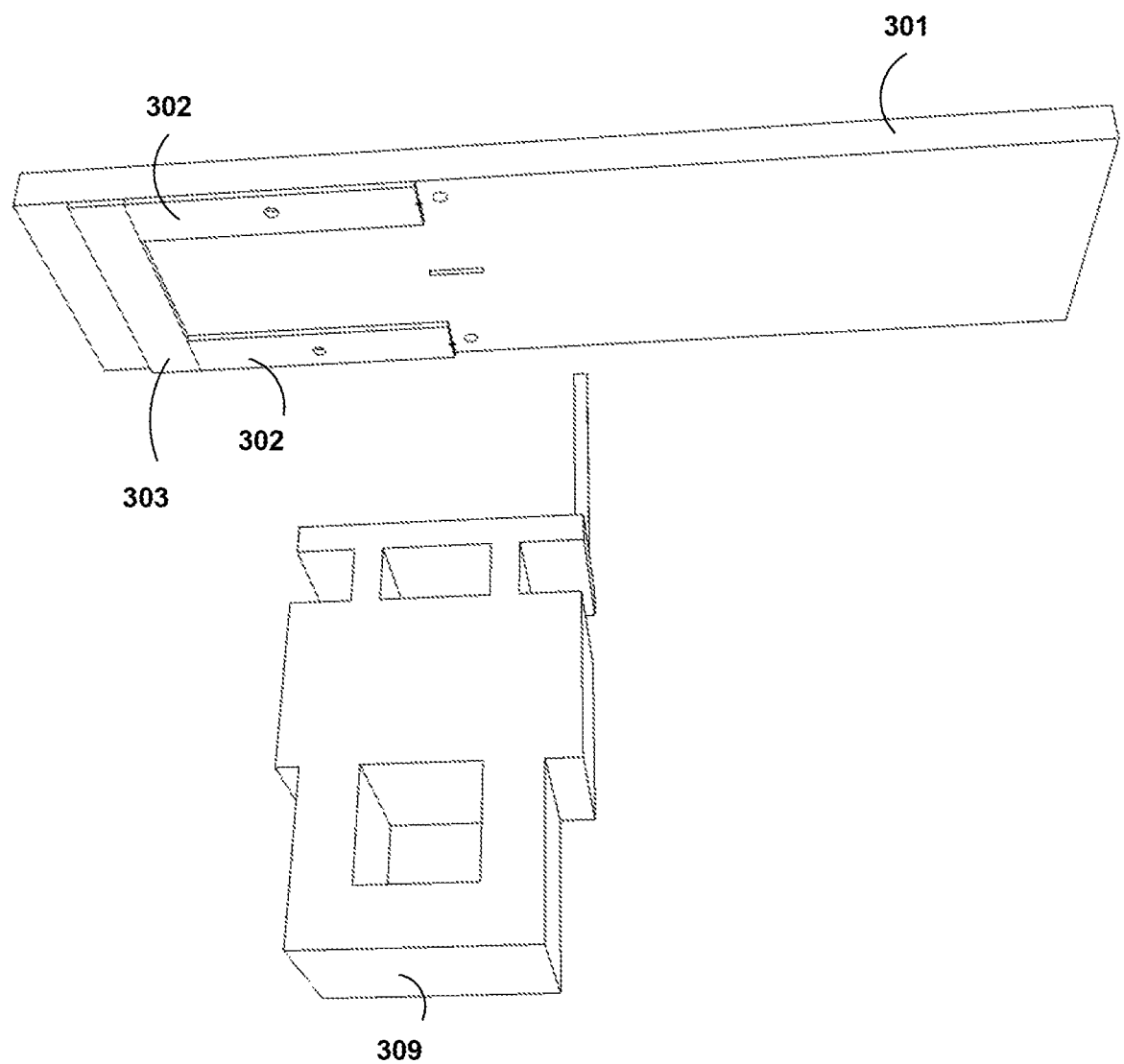
Figure 15:
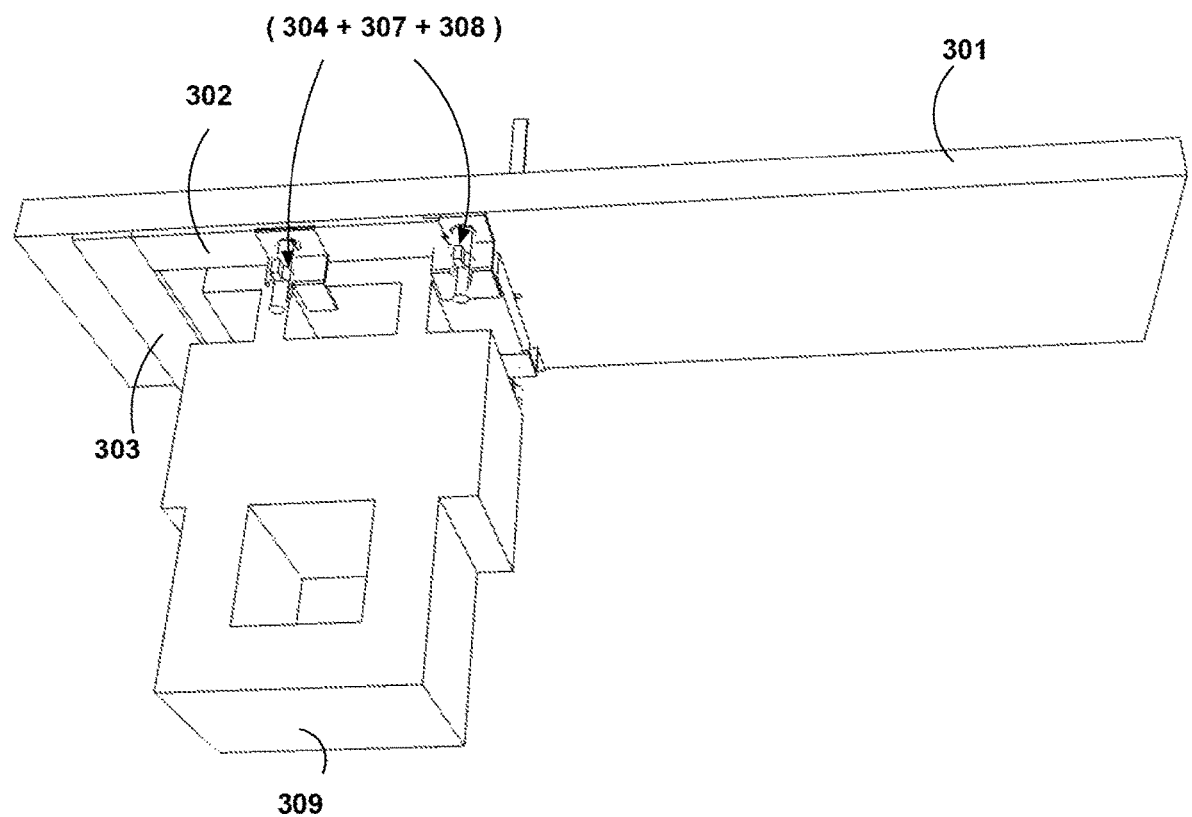
Figure 16:
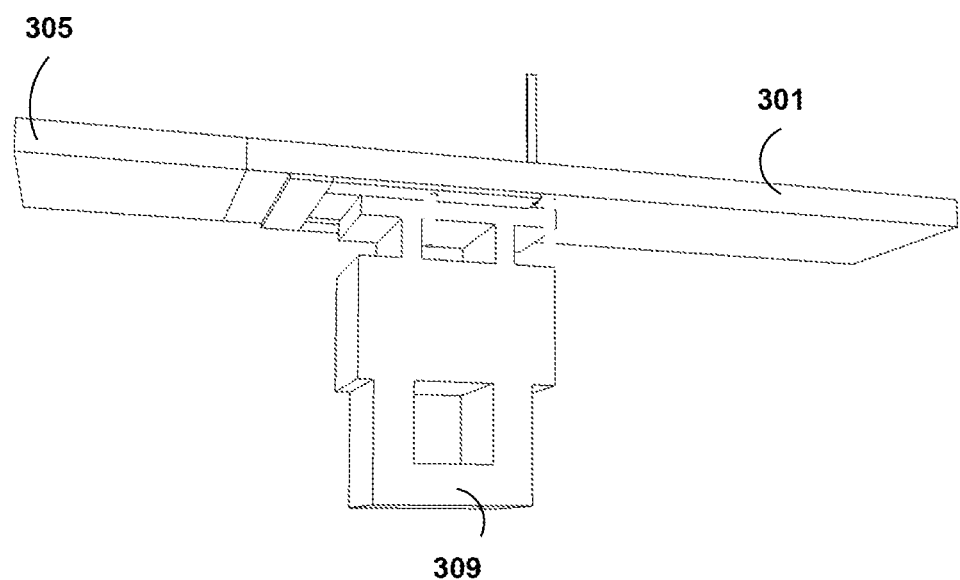
Figure 17:
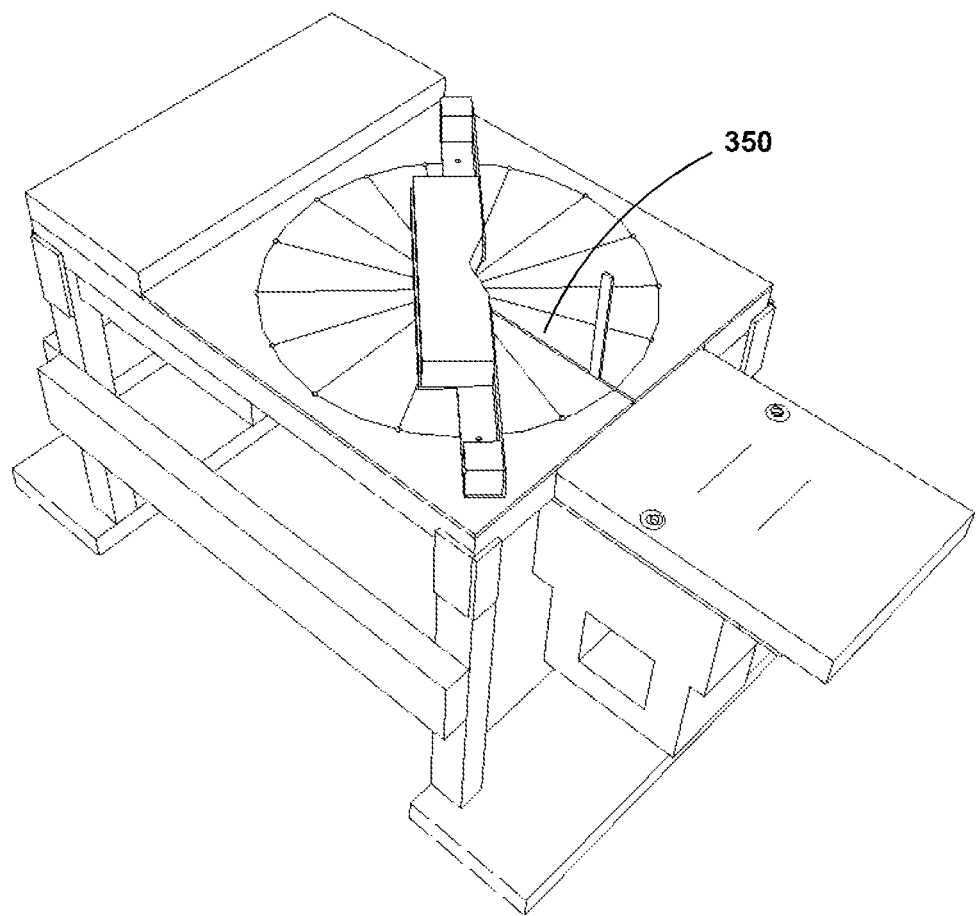

FIG. 3 Operation of Slide—Slide with saw, in separate support, with table now movable FIG. 4 Operation of Slide—Slide with saw, with table moving against saw FIG. 5 Base components—Base of table, disassembled FIG. 6 Base components—Base of table, Assembled FIG. 7 Backplate components—Support arm for table, disassembled FIG. 8 Backplate components—Support arm for table, assembled FIG. 9 Table components—Table, disassembled FIG. 10 Table components—Table, more closely assembled FIG. 11 Table components—Table, assembled FIG. 12 Table components—Support piece for base, for stationary saw operation FIG. 13 Slide components—Slide, disassembled FIG. 14 Slide components—Slide, assembled, bottom view, for saw insertion FIG. 15 Slide components—Slide, assembled, with saw attached FIG. 16 Slide components—Slide, assembled, with saw attached, side view FIG. 17 Table—Groove cut in table, and saw blade sliding into groove COMPONENT PARTS are referenced related to sections of the invention as noted, and are grouped in sections for descriptive value.

Components of BASE—320 to 326, and 329

Components of SLIDE—301 to 308, and 310 and 311

Components of TABLE—340 to 344, and 348 and 349 and 350

Components of BACKPLATE—360 to 364, and 369

Components of MISC—309, 312, and 999

Comparison of Current Cutting Methods, and Miter Cutting Slide for Jig Saw

Using a Standard Miter saw—it is Bulky, usually on Sawhorses or on a platform, and there is difficulty of dealing with longer material needing cutting.

Using a Radial Arm Saw. Difficult, requires Dust Collector, it has to remain stationary, not easily movable in a construction site.

Using a Band saw, it is on a stand, ok for larger objects, but bulky for cutting thin long objects, not easily movable for frequent cuts, usually stays in one or two locations on a construction site.

Saw blade TEETH width, typical saw blade (circular saw, table saw, radial arm saw, miter saw), width is very wide between teeth, this makes it difficult to do finer cuts on more delicate material. It is much easier when using the Jigsaw and stand, with finer blades. The Jigsaw has availability of various blades, of various teeth width, to help match it to the material being cut.

Detailed Description of Miter Cutting Slide for Jig Saw

SEE FIG. 1, FIG. 2, FIG. 3, and FIG. 4, for some views that reflect the following assembled sections of the MITER CUTTING SLIDE FOR JIG SAW. This provides a review of the device. Then a SEPARATE SECTION below shows the COMPONENTS and CONSTRUCTION of the different parts of this device.

The MITER CUTTING SLIDE FOR JIG SAW is composed of a straight narrow board (this is the SLIDE (310)), onto which the JIG SAW (309) will be fastened, facing forward, on the underside of the SLIDE (310). The JIG SAW (309) is approximately centered front-to-back on the SLIDE, and the BLADE when inserted will protrude through the centered SLOT in the SLIDE, at approximately the center length of the board. The JIG SAW is fastened (in working prototype) with 4 countersunk machine screws, with 4 clamps placed against the base of the JIG SAW, and then spacers and wing nuts are attached to the machine screw, to fasten the JIG SAW (309).

SPACERS are added, over the CLAMPS, before the WING NUTS. These spacers allow the wing nut to sit higher to be tightened, so the user's fingers don't have to tighten the wing nuts when it is close to the base of the saw. It is easier to tighten when it sits higher.

PROTOTYPE—the clamps used are ELECTRICAL CONDUIT CLAMPS, because of being easily available. A better clamping/securing system is possible, once actual production would start; various clamping systems could be used that may be easier to implement, but this current prototype method actually works very well.

The SPACERS used consist of 3 of 5-16 nuts, drilled out so no threads exist, Making it easy to slip over the ¼-18 bolts.

IMPROVEMENT during PRODUCTION—a more mass produced spacer and clamp system.

The SLIDE (310) has an outlined area (prototype used ⅛ inch hardboard) which outlines the base of the JIG SAW (309), so that when clamped down, it is centered correctly.

The SLIDE (310) is marked to show the maximum backward position it can be pulled to, without falling out of its supporting stand, so that the user can see how far back it can go safely. It is also marked with the maximum forward position it can go, so the user is aware, but the SLIDE is also set to STOP at the maximum forward position, so the user does not cut through the BACKPLATE (369) that supports the material being cut. (SEE IMAGE SECTION)

IMPROVEMENT during PRODUCTION—the position of the JIG SAW (309) on the SLIDE (310) will be unique to each brand of JIG SAW (309), so there can be a template provided, to show which holes need drilled, to position each brand of JIG SAW at the central part of the SLIDE, and this also will help adjust balance for each unit. The BLADE should always be at the same position, so the BOTTOM of the SLIDE would have the templates designed for marking. ALSO, it may be possible to pre-drill holes, depending on the varieties of JIG SAWS on the market, and if the product would get aimed at the top 5 jig saws, for example, thus decreasing the number of templates needed. In all practicality, this MITER CUTTING SLIDE FOR JIG SAW would not be suited to all jig saws, not because of a deficiency of the MITER CUTTING SLIDE FOR JIG SAW, but because of the limitations of some jig saws, which are just entry level, lack a variable speed trigger, or an adequate base plate.

IMPROVEMENT during PRODUCTION—a rear handle and trigger system, to attach to the underside of the SLIDE, with a cable type system that would connect and control the variable speed trigger of the JIG SAW. This would allow the operator to not have to reach as far downward to control the JIG SAW, but more rearward onto a more accessible handle with a trigger on it.

The second part of the MITER CUTTING SLIDE FOR JIG SAW is the TABLE (348). The TABLE (348) consists of a ⅛ inch piece of hardwood, marked with degree markings of 90, 45 (left and right) and 22½ (left and right). The BACKPLATE (369) (third part) will fit onto the TABLE (348), easily adjustable with just two pins, and line up with the angled markings. The TABLE (348) is made of thin material, because a limitation of the JIG SAW (309) is the length of the BLADES. Mass production only produces blades about 4 and ½ inches, although some 6 inch blades are made, but in limited teeth configurations. The thinner the TABLE (348), the more blade will be able to be visible and be used to cut thicker material.

IMPROVEMENT during PRODUCTION—the SLIDE (310) can also be made of thinner material, once production starts, and we evaluate what thinner material will have the support strength similar to the current prototype which used ¾ inch plywood. The thinner the SLIDE and TABLE are, again the more blade is usable.

The TABLE (348) has two ¾ inch pieces of wood, sandwiched in the middle at the front third of the TABLE, that straddle the SLIDE. Then there is an additional ¾ inch piece of wood, on the underside of those pieces, that cross UNDER the SLIDE path, and this is what supports the SLIDE from falling out, and allows forward/backward sliding and cutting.

The third part of the MITER CUTTING SLIDE FOR JIG SAW is the BACKPLATE (369). This consists in prototype, of an angled piece of aluminum, supported in the center by a block of wood. This supporting piece of wood is epoxied to the aluminum, and this allowed me to cut out a small triangle, spanning the 45 degrees left and right, to allow the blade to cut directly through the material being worked on, and NOT cut further through the BACKPLATE (369), and still allow the BACKPLATE to have structural integrity and remain straight and supportive to the material against it. The BACKPLATE is adjusted on the left and right edges, with a removable pin, which fits into precision holes in the TABLE, so that the desired angle can be selected, and the material placed against the BACKPLATE, and cut.

IMPROVEMENT during PRODUCTION—the BACKPLATE (369) can be designed to allow for rotating around a central point, with a central locking nut, thus bypassing the limitations of just specific common angles, allowing for infinite angle adjustment. Also, for safety, a plastic shield could be added to the BACKPLATE (369), which rises vertically, and then comes forward horizontally, thus covering the cutting site, and the blade, yet allowing visibility of the cutting area.

The fourth part of the MITER CUTTING SLIDE FOR JIG SAW is the BASE (329), which in the prototype is a 9½ inch high frame, with 4 corners at the top, which support the 4 corners of the TABLE (348). The corner supports on the BASE (329) support both the left-right, and front-back, edges of the TABLE (348) corners, so the table cannot slip out of the BASE when the SLIDE is being moved. The BASE has a board on the bottom of the legs, in the front and the back, that extend about 3 inches beyond the front and back edge of the BASE. This allows for support and ability to clamp, the front and back edges, adding more stability.

The BASE (329) is designed to be slightly higher than the height of the JIG SAW (309). This allows for free movement of the SLIDE (310), with the JIG SAW attached, and for easy ability to reach the speed control/trigger of the JIG SAW.

NOTE, as above, various JIG SAWS may need a different height, and the BASE (329) can be easily adapted to an adjustable height method, to accommodate different JIG SAWS. ALSO, as noted, NOT ALL JIG SAWS may be able to be accommodated, not because of the MITER CUTTING SLIDE FOR JIG SAW but because of a specific JIG SAW design, or difficulty to reach the trigger/speed control when the JIG SAW is mounted upside down.

IMPROVEMENT during PRODUCTION—the BASE may be converted to folding arms that rotate up to the side of the TABLE, thus increasing portability of the unit, and ability to then extend the legs of BASE when ready to do cutting.

IMPROVEMENT during PRODUCTION—the BASE height may be adjusted by ADJUSTABLE LEGS, thus taking care of height accommodations for various models of JIG SAWS, to allow adequate clearance under the handle/trigger mechanism of the JIG SAW when attached to the SLIDE The BASE (329) design allows for insertion of the TABLE (348) with marked angles and BACKPLATE (369), which allows the JIG SAW and SLIDE to move, while the BASE and TABLE remain stationary. This allows the operator to hold the JIG SAW handle, and speed control, and move the JIG SAW and SLIDE forward and backward relative to the TABLE.

THE BASE (329) is also designed to accept a SLIDE SUPPORT TABLE (349), where the HARDBOARD with marked angles is replaced with a more sturdy ¾ inch thick×10 inch wide×10 inch front to back board (or other sturdy production material.) The SLIDE ALSO was modified to be longer at the rear portion. THEN, with the JIG SAW (309) mounted, the JIG SAW and SLIDE could be mounted into the BASE which has the SLIDE SUPPORT TABLE, thus making the JIG SAW and SLIDE stationary, and allow the TABLE to be placed on the FRONT of the JIG SAW (309) and SLIDE, and that TABLE to be moved, relative to the JIG SAW and SLIDE. In that case, the operator does not have to control the speed of the JIG SAW, as the trigger would be placed in an always-on position.

The versatility of having the JIG SAW and SLIDE move, relative to the TABLE (348), OR having The TABLE (348) move, relative to the JIG SAW and SLIDE WITH REAR EXTENSION (311), Allows great versatility for the operator of the device, depending on types of cuts to be made and type of material to be worked with.

Operation of Miter Cutting Slide for Jig Saw

SEE FIG. 1, FIG. 2, FIG. 3, and FIG. 4, for some views that reflect the following assembled sections of the MITER CUTTING SLIDE FOR JIG SAW. Then a SEPARATE SECTION below shows the COMPONENTS and CONSTRUCTION of the different parts of this device.

Operation of the Jig Saw (309) and Slide (310) being Moved, while the Base (329) and Table are Stationary When operating, the material to be cut is placed on the TABLE, and the SLIDE (310) is pulled backward, to allow correct material placement, and correct angle adjustment. When ready to cut, the user grasps the JIG SAW (309) handle, pulls the trigger to start the machine, and moves the JIG SAW (309) and SLIDE (310) forward, at their own pace, to cut into the material, which the user is holding against the BACKPLATE (369) with the other hand. If the material is long, it can be easily supported on some blocks, or other raised object, OR if using the MITER CUTTING SLIDE FOR JIG SAW at ground level, the material may be left on the ground and flexed enough to comfortably rest on the TABLE, since the whole apparatus is only about 10 inches above the floor. Once one end of a long piece is cut, the MITER CUTTING SLIDE FOR JIG SAW can be easily moved to the other end of the material (which may sometimes be 12 to 16 feet long) and perform the cut at that end, rather than trying to manipulate a 12 to 16 foot piece of material turning it end for end.

PRODUCTION—SAFETY—currently in PROTOTYPE, the blade does not have a guard over it. A guard has been thought of, and is noted above in the IMPROVEMENT IN PRODUCTION section for the BACKPLATE (369).

BUT sometimes, with a saw such as a JIG SAW (309), there is no guard over the blade ANYWAY, when it is used. The operator has one hand on the JIG SAW handle, and another hand (or clamps) on the material being cut, and is moving the saw at a controlled pace. AND, the visible blade allows for easier lineup to the cutting lines on the material being cut.

Operation of the Table being Moved, while the Jig Saw (309) and Slide with Rear Extension (311) Remain Stationary The WORKING PORTION of the SLIDE with REAR EXTENSION (311), including the movement marks, hole for saw blade, and JIG SAW (309) mounting screws, and the TABLE (the table with the angled hardboard portion which mounts the BACKPLATE (369)) are IDENTICAL in this operation as compared to the operation where the JIG SAW (309) and SLIDE move relative to the TABLE (348)

In this case, a SLIDE WITH REAR EXTENSION (311) is created which is 5 inches longer in the rear. This portion of the SLIDE WITH REAR EXTENSION (311) then fits into the SLIDE SUPPORT TABLE (349) (which has the supporting board rather than the thinner hardboard marked with angles), which fits into the same BASE (329). This BASE (329) plus SLIDE SUPPORT TABLE (349) is then clamped into position, and the TABLE (348) with BACKPLATE (369) and hardboard with angles, is placed on the FRONT of the SLIDE WITH REAR EXTENSION (311), and then that TABLE (348) can be moved relative to the stationary JIG SAW and SLIDE WITH REAR EXTENSION (311).

(I did not build a prototype of that SLIDE WITH REAR EXTENSION (311) and SLIDE SUPPORT TABLE (349). I do have the sketched drawings of that combination) OPERATION IN REAL-TIME of MITER CUTTING SLIDE FOR JIG SAW Prototype These show the prototype in operation. These help to understand the usefulness of this SLIDE system. The system is detailed in normal line drawings, but these greyscale figures provide a day-to-day usage of the system.

FIG. 1 This shows the unit with its main component parts, taken to worksite, being set up.

The TABLE 348 goes into the BASE 329, the BACKPLATE 369 goes onto the TABLE, and the JIG SAW 309 mounted to the SLIDE 310 goes into the TABLE.

FIG. 3 This shows the unit with its main component parts, in the configuration where the TABLE 348 will move, relative to a STATIONARY SLIDE with REAR EXTENSION 311. It also shows a piece of material 312 (not part of apparatus) which the operator is preparing to cut.

FIG. 2 This shows everything assembled, ready for operation.

FIG. 4 This shows the unit operational, similar to FIG. 2, with material in position to be cut, and here the TABLE will be moved toward the JIG SAW and SLIDE 311 to accurately cut the material.

FIG. 17 This shows the JIG-SAW, attached to the SLIDE, positioned in the TABLE AND BASE.

FIG. 17 BACKPLATE is attached to TABLE top, ready to have material positioned against this for cutting.

Components and Construction of Miter Cutting Slide for Jig Saw

COMPONENT 999—this is NOT PART of the device, it is a measurement block 1 inch×1 inch×1 inch, for reference for size of parts. It is included in many of the drawings where applicable.

COMPONENT 312—PIECE of wood molding which is being cut (for demonstration, not part of construction of device)

COMPONENT 309—JIG SAW, COMPLETE (obtained separately from various tool supply sources, my device does not claim invention of the JIG SAW, my device is used to CONNECT and OPERATE available JIG SAWS or similar saws that are manufactured by others separately)

PROTOTYPE has been built, the model allowing movement of the JIG SAW and SLIDE within the TABLE. But PROTOTYPE does not reflect all combinations for the MITER CUTTING SLIDE FOR JIG SAW. The descriptions of components, and other improvements reviewed, reflect advancements and modifications in design to allow for other cutting abilities and operator interactions with this apparatus. The PROTOTYPE as described thus does not LIMIT the design to only the prototype, but final and improved design can include (but not be limited to) modifications as discussed throughout this document. The design is not limited to the MATERIALS described in prototype, but may incorporate more varied materials based on availability in a more mass-production environment. Such materials may enhance usefulness and ability of this product (such as thinner SLIDE material which can make the JIG SAW BLADE more useful by having more of the BLADE exposed)

WOOD PARTS are GLUED and BRAD-NAILED to each other during PROTOTYPE construction unless otherwise noted. During more mass production, other fastening methods may augment or replace the prototype method, making for easier assembly.

Base—Components (Prototype Pieces are Wood Unless Otherwise Noted)

329—BASE—COMPLETE, ASSEMBLED

FIG. 5 This shows component view of the BASE

FIG. 6 This shows the BASE fully assembled

320—FRONT and REAR clamping support pieces (TWO of them) ¾ inch thick, 11½ inch wide, 3¾ inch front to back 321—Side-Support piece, FRONT—¾ inch thick, 2 inches high, 10 inches wide 322 Side-Support Pieces, LEFT and RIGHT (TWO of them)—¾ inch thick, 2 inches high, 14 inches front to back 324 (FOUR of them) ¾ inch wide, 1 inch front to back, and 9½ inch high 325—(FOUR of them)—⅛ inch thick, 2 inches high, ¾ inch wide 326—(FOUR of them)—⅛ inch thick, 2 inches high, 1 inch front to back Base—Construction 320 are placed at the front and back of the bottom of the base. 324 are placed on top edge of rear part of front 320, ¾ inch from left and right edge, and are placed at top edge of front part of rear 320, ¾ inch from left and right edge.

321 is placed across front of the two front 324, horizontal, its lower edge at 4 inches from bottom of the 324 pieces.

322 are placed left and right laterally; left one across the left outer edges of the two left 324, at 4 inches from bottom of the 324 pieces. Same thing for right side, right piece of 322.

325 placed at top front of the front 324 pieces, and at the top rear of the rear 324 pieces. The lower edge of 325 is placed at 8 inches from bottom of 324.

326 placed at left side of left 324 pieces, and right side of right 324 pieces, lower edge of 326 at 8 inches from bottom of 324 pieces.

Placement of 326 and 325 allow for ½ inch elevation above top edge of 324, so the TABLE can rest within these elevations, and thus allow for support of the TABLE to prevent forward and backward movement of table when supported by the BASE.

BASE is designed to support TABLE when stationary and the JIG SAW and SLIDE combination move relative to the TABLE, and also to support the SLIDE SUPPORT TABLE when the JIG SAW and SLIDE combination is held stable at the rear position by the SLIDE SUPPORT TABLE, with the regular TABLE attached at the forward position and that TABLE moves relative to the JIG SAW and SLIDE combination.

Slide—Components (Prototype Pieces are Wood Unless Otherwise Noted)

310—SLIDE, COMPLETE, ASSEMBLED
311—SLIDE with REAR EXTENSION, COMPLETE, ASSEMBLED FIG. 13 This shows components of SLIDE.

FIG. 14 This shows bottom view of SLIDE, with positioning of JIG SAW onto the SLIDE.

FIG. 15 This shows JIG SAW, attached to SLIDE, with BOLTS 304 and SPACERS 307 and WING NUTS 308

FIG. 16 This shows the assembled SLIDE, along with EXTENSION for REAR of SLIDE 305, which converts the slide into the stationary part of the device, whereby it fits into the SLIDE SUPPORT TABLE 349 (not shown in this diagram) and thus the TABLE 348 (not shown in this diagram) is able to be the movable part of the device.

301—SLIDE, ¾ inch thick, 5 inches wide, 19 inches front to back.
 CENTER for blade is at 11⅝ inches from front of slide
 GUIDE MARKS at 14¹¹⁄₁₆, and 16⅛ inches from front
 BOLT HOLES (centers, 4 of them) at 11½ and 14½ inch from front, and ⁷⁄₁₆ inch from side 302—JIG SAW Guide Lateral (TWO of them)—⅛ inch thick, 1 inch wide, and 5⅛ inch front to back.

303—JIG SAW Guide Rear—⅛ inch thick, 5 inch wide, and 1 inch front to back

304—BOLTS (FOUR of them) (metal) are ¼-18×2, flat-head countersunk.

305—EXTENSION for rear of SLIDE, ¾ inch thick, 5 inch×5 inch, to rigidly fix to rear of SLIDE for structural integrity, to allow for the JIG SAW and SLIDE combination to remain stationary in the BASE with SLIDE SUPPORT TABLE at rear, and the regular table able to be attached at the front, as normal, but has ability to move forward and backward relative to the JIG SAW and SLIDE.

306—JIG SAW Hold-down bracket front (FOUR of them)—in PROTOTYPE these were from electrical conduit connectors, with a 1 inch×1 inch approximate flat face, then a curved part that goes over electrical conduit, but here they are used for fastening down the JIG SAW to the SLIDE. In the DRAWINGS the front and rear ones were drawn slightly differently due to my limited skill in drawing the JIG SAW and getting edges to line up. But the function of these brackets is flexible, and they can be modified easily to match various JIG SAW configurations.

307—SPACERS (FOUR of them) to allow elevation of 308 above the JIG SAW edge, to allow for easier tightening.

308—WING NUTS, ¼—18 (standard configuration), to tighten down the 307 onto the 306, thus fastening the JIG SAW to the SLIDE.

Slide Construction 301 is cut, and then CENTER HOLE for BLADE is cut, at indicated position. GUIDE MARKS are added at indicated positions.

301 is flipped over to view the bottom. 302 are placed on the face of bottom of this, with the front edge of 301 is placed at 11⅞ inches from front, on left and right side, and the long part of 301 faces front to back.

303 is placed with the 5 inch part lying across the 5 inch face of 301, with the front edge of 303 at 17 inches from front edge of 301

HOLES are then drilled for the 304 bolts at indicated positions. 301 then has the TOP FACE have countersinking holes drilled to accommodate the tops of the bolts so the top of the 304 are flush with top face of 301.

304 are then epoxied into the top portion of 301 so that 304 do not rotate when the fastening wingnuts are applied to 301 when attaching JIG SAW.

SLIDE construction to this stage has the JIG SAW and SLIDE ready to be used in mobile status, within the stationary BASE and TABLE combination.

The FOLLOWING steps of adding 305 do NOT AFFECT any of the operation of the JIG SAW and SLIDE moving relative to the TABLE. That is the core part of the apparatus. The addition of 305 allows more versatility of the apparatus.

Adding 305 to the REAR of the SLIDE adapts the SLIDE adapts it to operate in STATIONARY position, with the TABLE being the mobile part of the unit. 305 can be added to REAR part of 301, glued or epoxied or otherwise fastened permanently, and it could then be used for both stationary status (its rear portion being mounted in the SLIDE SUPPORT TABLE), or for mobile status (sliding freely in the forward TABLE). However, that permanent attachment makes the SLIDE somewhat more bulky for mobile use (slightly more cumbersome for operator to reach the JIG SAW).

A more flexible attachment method which would allow easy attachment AND removal of 305 would be to either drill matching dowel rod holes in the front face of 305, and in the rear face of 301, about ¾ inch in from left and right edge, and have long dowel rods that allow inserting of dowel rods into 301 rear, then slide 305 front face onto the dowel rods. Also a Mortise and Tenon joint could be used. Either way, all this can be evolved more in production, but in no way detracts from the operation of the JIG SAW and SLIDE combined with TABLE.

FIG. 17 This shows the SLIDE, inserted into the TABLE. The BLADE is in the TABLE SLOT 350. The TABLE SLOT gets cut on the first use and first pass of the SLIDE onto the TABLE, by the BLADE. Subsequent uses now have the SLOT as a guiding path, for the BLADE, to precisely cut the material.

Table—Components (Prototype Pieces are Wood Unless Otherwise Noted)

348—TABLE, COMPLETE, ASSEMBLED
349—SLIDE SUPPORT TABLE, COMPLETE, ASSEMBLED

FIG. 9 this shows component view of TABLE before assembly. It shows the ALTERNATE parts that can be interchanged, 343 hardboard, used for the standard TABLE, and 344 ¾ inch thick board (or similar material) that is used when making the SLIDE SUPPORT TABLE.

FIG. 10 this shows assembled view of the standard TABLE.

FIG. 11 this shows assembled view of the standard TABLE, slightly different view.

FIG. 12 this shows assembled view of the SLIDE SUPPORT TABLE, the only difference being replacement of 343 with 344.

340—Support Piece, Bottom—¾ inch height, 10 inches wide, and 7½ inches front to back, with front side corners notched out
 as 1½×1½ inches removed, to allow for fitting into BASE

341—Support Piece, TOP FRONT—¾ inch height, 10 inches wide, 4 inches front to back

342—SLIDE GUIDES, LEFT and RIGHT—fit into middle of TABLE—(TWO of them)—wood, ¾ inch height, 2½ inches wide, 14 inches front to back

343—hardboard, ⅛ inch height, 10 inches wide, 10 inches front to back, marked with angled lines for lining up the BACKPLATE work guide, for appropriate angles to cut

344—SLIDE SUPPORT TABLE variation—¾ inches height, 10 inches wide, 10 inches front to back, this replaces 343 when making a SLIDE SUPPORT TABLE TABLE—CONSTRUCTION

342 gets placed on left and right side, with 14 inch dimensions parallel to each other, separated 10 inches wide. 341 gets placed with its front edge lying on top of the 342 pieces, with 10 inches being the width, the ¾ inch edge in the front. 343 gets its front edge placed against the rear edge of 341, and is fastened to the 342 pieces.

This unit is flipped to show bottom side up, and 340 is then placed with its front edge matching the front edge of the 342 pieces, with the ¾ inch edge facing forward.

If making a SLIDE SUPPORT TABLE, then 344 replaces 343, to allow for better support of the JIG SAW and SLIDE, and everything else is assembled identically.

Backplate—Components

369—BACKPLATE, COMPLETE, ASSEMBLED

FIG. 7 This shows component view of the BACKPLATE, first totally separate view, then second image is partially assembled, parts being lined up.

FIG. 8 This shows the BACKPLATE fully assembled

360—Aluminum right angle piece, 1/16 inches thick, ¾ inch flat, ½ inch high, 6 inches wide

361—wood, 6 inch width, 1½ inch flat, and ¾ inch height

362—Aluminum right angle piece, 1/16 inches thick, ¾ inch flat, ½ inch high, 12 inches wide—holes at 9 inches, ⅛ inch diameter, ⅜ inch from rear edge of horizontal part of the piece.

363—end pieces, (TWO of them), ¾×¾×¾ inches

364—Pins (metal, TWO of them), ⅛ inch diameter, 2 inches long BACKPLATE—CONSTRUCTION

362 is main component of this. It is right angle aluminum, and the ½ inch high edge of it faces forward. Holes are drilled ⅜ inch from back flat edge, 1½ inch from each end, to accommodate 364 pins when placing the apparatus onto the TABLE.

363 pieces are epoxied (or other alternate fastening method) to the flat outer ends of 362, to allow for clamping the BACKPLATE to the TABLE if needed for extra stability.

361 is fastened with ¾ inch edge facing forward, with its center front matching the center rear part of the ½ inch face of 362.

360 is fastened with its ½ inch high face matching the rear ¾ inch face of 361, with flat ¾ inch side of 360 attached to bottom of 361. This allows for support of the rear of the BACKPLATE, so all its edges are supported equally and it lies in a truly flat position.

At the front center face of 362, a notch is made (which includes notching the front of the attached wood piece 361) so that when materials are being cut, the blade does not cut further into the BACKPLATE, and also so that if a blade designed for wood is used, it does not get damaged by cutting into the aluminum (or other alternate metal material) of 362.

The invention claimed is:

1. A miter cutting slide for a jig saw comprising:
   a slide configured to support a hand-held, motorized jig saw with fasteners on a lower surface thereof;
   a slot disposed in the slide configured to receive a blade of the jig saw supported by the slide;
   a table comprising a top plate, a back plate, and a base;
   two slide guides disposed beneath the top plate, wherein each slide guide has an edge aligned with a respective side edge of the top plate forming a slide-receiving space between the two slide guides, wherein the base supports the top plate, the back plate, and the two slide guides such that a handle and/or trigger mechanism of the jig saw can slide below the top plate while using the miter cutting slide to cut a work piece, and
   wherein the slide is configured to be inserted into the slide-receiving space and such that the blade of the jig saw can be moved towards the table as the slide is moved through the slide-receiving space.

2. The miter cutting slide for a jig saw according to claim 1, further comprising:
   a plurality of precision holes disposed in the top plate;
   first and second holes disposed in the back plate; and
   first and second pins configured to be inserted into the first and second holes of the back plate, respectively, and further be inserted into respective first and second ones of the plurality of precision holes in the top plate, whereby the back plate can be arranged at a desired angle with respect to the blade of the jig saw thereby allowing a work piece to be positioned at the desired angle with respect to the blade of the jig saw.

3. The miter cutting slide for a jig saw according to claim 2, further comprising:
   angle markings disposed on the top surface of the top plate, wherein each of the plurality of precision holes is aligned with a respective angle marking thereby allowing a user to align the back plate at a specific angle with respect to the blade of the jig saw.

4. The miter cutting slide for a jig saw according to claim 1, wherein the back plate comprises a first right angle piece of aluminum and a center block adhered to a center of the first right angle piece of aluminum.

5. The miter cutting slide for a jig saw according to claim 4, wherein the back plate further comprises triangle cut-out in the center of the back plate passing through the first right angle piece of aluminum and the center block.

6. The miter cutting slide for a jig saw according to claim 4, wherein the back plate further comprises two end pieces fastened to opposite ends of the first right angle piece of aluminum.

7. The miter cutting slide for a jig saw according to claim 4, wherein the back plate further comprises a second right angle piece of aluminum attached to a back portion of the center block.

\* \* \* \* \*